(12) United States Patent
Ausserlechner

(10) Patent No.: US 10,288,449 B2
(45) Date of Patent: May 14, 2019

(54) DETECTION OF A ROTATIONAL POSITION OF A SHAFT

(71) Applicant: InfineonTechnologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 352 days.

(21) Appl. No.: 14/994,229

(22) Filed: Jan. 13, 2016

(65) Prior Publication Data

US 2016/0223358 A1 Aug. 4, 2016

(30) Foreign Application Priority Data

Jan. 30, 2015 (DE) .................. 10 2015 101 363

(51) Int. Cl.
*G01D 5/14* (2006.01)

(52) U.S. Cl.
CPC .................................. *G01D 5/145* (2013.01)

(58) Field of Classification Search
CPC ....................................................... G01D 5/145
See application file for complete search history.

(56) References Cited

U.S. PATENT DOCUMENTS

| 2004/0164733 A1* | 8/2004 | Fukaya | G01D 5/145 324/207.25 |
| 2008/0066710 A1* | 3/2008 | Stemmer | F02F 7/0046 123/195 C |
| 2008/0302207 A1* | 12/2008 | Breidenbach | F16C 9/00 74/595 |
| 2010/0001721 A1 | 1/2010 | Inotsuka et al. | |
| 2012/0018187 A1* | 1/2012 | Berchtold | H01L 21/4821 174/50 |
| 2014/0251275 A1* | 9/2014 | Lana | F02M 63/0225 123/452 |
| 2015/0022186 A1 | 1/2015 | Ausserlechner | |

FOREIGN PATENT DOCUMENTS

| CN | 102072698 A | 5/2011 |
| CN | 102124304 A | 7/2011 |
| CN | 102679864 A | 9/2012 |
| CN | 104197827 A | 12/2014 |
| DE | 10010700 C1 | 9/2001 |
| DE | 10309027 A1 | 9/2004 |
| DE | 102011088710 A1 | 6/2012 |
| DE | 112011100738 T5 | 6/2013 |
| DE | 102014109950 A1 | 1/2015 |
| WO | 2011/107407 A2 | 9/2011 |

OTHER PUBLICATIONS

Office Action dated Aug. 17, 2016 for German Patent Application No. 102015101363.0.
Office Action dated Dec. 21, 2017 issued for Chinese Patent Appleation No. 201610063549.4.

* cited by examiner

*Primary Examiner* — Daniel R Miller
(74) *Attorney, Agent, or Firm* — Schiff Hardin LLP

(57) ABSTRACT

An embodiment relates to an angle sensor for detecting a rotational position of a shaft to which a magnetic field arrangement is attached, comprising: a first sensor element, a second sensor element, a support structure, wherein the first sensor element and the second sensor element are mechanically coupled to the support structure, wherein the support structure is arranged to be mechanically connected to a hull, wherein the hull at least partially encloses the shaft.

19 Claims, 7 Drawing Sheets

DETECTION OF A ROTATIONAL POSITION OF A SHAFT

BACKGROUND OF THE INVENTION

Embodiments of the present invention relate to a detection of a rotational position of a shaft, in particular to a detection of a variation of rotation angle of the shaft. The shaft may be located inside a housing. The shaft may in particular be a cam shaft of an engine.

SUMMARY

A first embodiment relates to an angle sensor for detecting a rotational position of a shaft to which a magnetic field arrangement is attached, comprising:
- a first sensor element,
- a second sensor element,
- a support structure, wherein the first sensor element and the second sensor element are mechanically coupled to the support structure,
- wherein the support structure is arranged to be mechanically connected to a hull, wherein the hull at least partially encloses the shaft.

A second embodiment relates to a system for detecting a rotational position of a shaft comprising:
- a magnetic field arrangement mechanically coupled to the shaft,
- a first sensor element,
- a second sensor element,
- a support structure, wherein the first sensor element and the second sensor element are mechanically coupled to the support structure,
- wherein the support structure is arranged to be mechanically connected to a hull, wherein the hull at least partially encloses the shaft.

A third embodiment relates to an engine, in particular a combustion engine, comprising at least one angle sensor as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
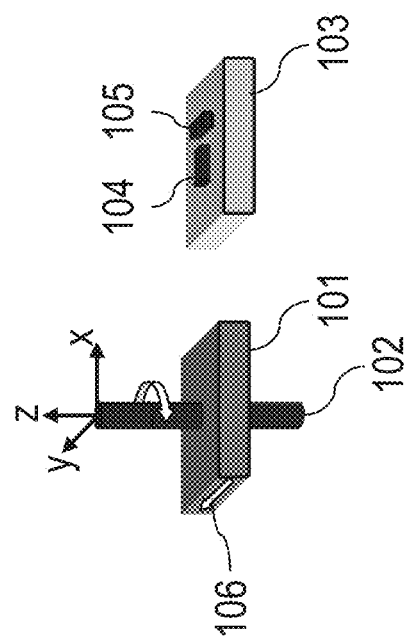
FIG. 1 shows an exemplary off-axis sensor arrangement, wherein a sensor is arranged perpendicular to the rotation axis of a shaft.

Examples presented in particular relate to a magnetic angle sensor. FIG. 1 depicts a magnet 101 with a bore that is mounted, e.g., on a through-shaft 102 (also referred to as shaft). A sensor 103 is located adjacent (off the rotational axis of the shaft 102) to the magnet 101. The sensor 103 is perpendicular to the rotation axis of the shaft 102. The sensor 103 comprises sensor elements 104, 105, which may be magnetic field sensors. The sensor 103 may be a silicon die. An arrow 106 indicates a direction of a diametrical magnetization. FIG. 1 also shows three mutually perpendicular axes x, y and z, wherein z is the rotation axis of the shaft 102 and x and y span a plane perpendicular to this rotation axis z.

The sensor 103 may be placed either beside the magnet 101 or it is below/above the magnet 101 and aside the shaft. In practice it may suffice if the sensor 103 is spaced apart from the magnet 101 such that the magnet 101 may freely rotate or move (not colliding with the sensor 103) with the through-shaft 102. Such an arrangement may be beneficial in case the end of the shaft 102 is not available or accessible for attaching the magnet 101.

Figure 2:
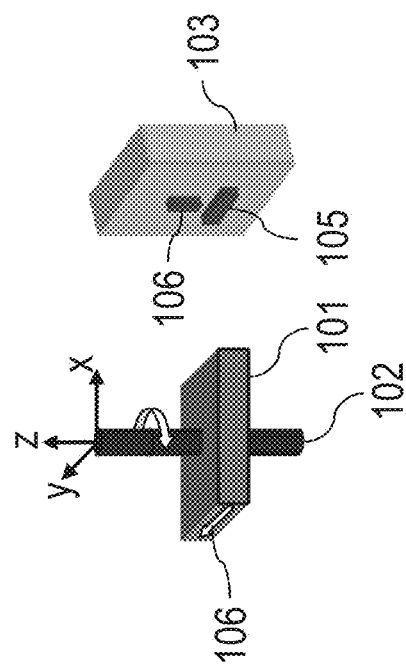
FIG. 2 shows an exemplary off-axis sensor arrangement, wherein the sensor is arranged in parallel to the rotation axis of the shaft.

FIG. 2 shows an alternative embodiment comprising the magnet 101 and the shaft 102 as shown in and explained with regard to FIG. 1. The sensor 103, however, is arranged in parallel to the rotation axis of the shaft 102.

It is noted that an infinite number of axial orientations exist for the sensor 103 to be arranged. For example, one edge of the sensor 103 may remain in parallel to the rotation axis of the shaft 102 and the sensor 103 may be turned (at any angle) around this edge. In one particular example, the surface of the sensor 103 may be arranged (substantially) tangential to a cylindrical surface, wherein the axis of such cylinder coincides with the rotation axis of the shaft 102. In another example, the surface of the sensor 103 may be arranged (substantially) perpendicular to such cylindrical surface.

Figure 3:
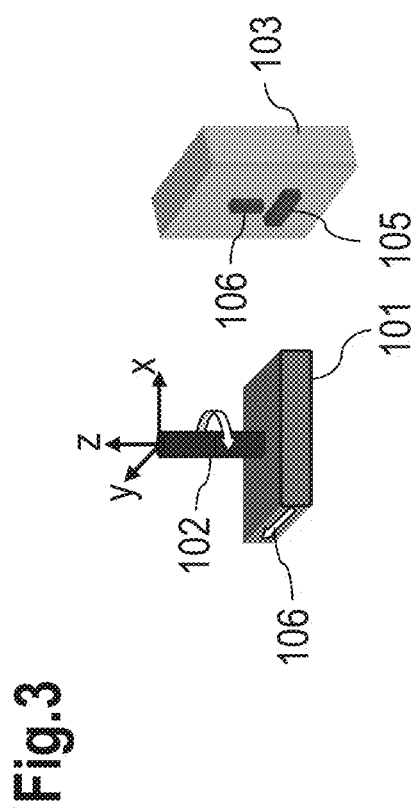
FIG. 3 shows an alternative embodiment of FIG. 2 with a magnet mounted at the end of the shaft.

FIG. 3 shows an exemplary embodiment with the magnet 101 being mounted at the end of the shaft 102. In this example, the sensor 103 is arranged in parallel to the rotation axis of the shaft 102.

In a particular scenario, the rotatable shaft may be located within a hull or casing. The shaft may be, e.g., a cam-shaft of an engine. A magnetic field arrangement may be coupled to the shaft and it may at least partially encircle the shaft. The magnetic field arrangement may comprise at least one magnet and/or it may be arranged to generate or modify a magnetic field pattern. There exist a variety of embodiments as how the magnetic field arrangement may be provided. Examples will be described below. However, the (at least one) magnet described in the embodiments may also be replaced by a different implementation of a magnetic field arrangement that may itself not have to comprise an actual magnet.

The magnetic field arrangement may be arranged at the shaft thereby (at least partially) increasing the diameter of the shaft. The diameter of the shaft may be in a range between 5 mm and 40 mm. An example for a shaft diameter is 24 mm.

The sensor may comprise at least two sensor elements that may preferably be located close to the magnetic field arrangement. A circuitry (e.g., an evaluation circuit) may infer the rotational position of the shaft from the magnetic field detected by the sensor via its sensor elements.

It is noted that the sensor elements may be arranged on a support structure, e.g., a frame. This support structure may be regarded as sensor. A purpose of the support structure may be to define the position of the at least one sensor element relative to the rotation axis. A second purpose of the support structure may be to hold the at least two sensor elements in a relative position to each other. Furthermore, the support structure or the sensor may comprise the circuitry (or portions thereof) and/or connecting means providing electrical connections to the sensor elements. The circuitry may in particular be part of the sensor itself or it may be external to the sensor. The sensor or the support structure may be connectable or connected to an external device, which may be part of the circuitry inferring the rotational position and/or part of a control unit for controlling the shaft and/or the engine which comprises said shaft.

The sensor may comprise more than two sensor elements. In particular the at least two sensor elements may be arranged on the support structure (sensor) such that at least two of them have a gap that is larger than a predetermined space. The predetermined distance may in particular be larger than the size of the sensor element, it may, e.g., be in the order of the radius of the shaft or larger than the radius of the shaft.

In many use cases, the magnetic field arrangement may not be freely accessible to the sensor elements. For example, in a cam-shaft scenario that requires angle sensors, cylinders of an engine already occupy the half-space below the cams. The upper half space is covered by the hull of the engine leaving very limited space and accessibility of the cam shaft. It is possible to drill holes into the hull through which an elongated module is placed. At the tip of such module sensor elements may be located. The tip of the module can be arranged such that it approaches the magnetic field assembly.

One requirement in the engine scenario may be that the module is replaceable (e.g., during a service interval) without having to remove the hull of the engine and in particular without having to take the shaft out of its bearings.

However, in case the sensor elements are located close to the tip of the module (in order for the sensor elements to be close together, e.g. within a distance of less than 5 mm) the rotational position of the magnetic field assembly may not be determined with high accuracy (e.g., better than 1.5°). This may be the case in particular if the magnetic field assembly is significantly larger than the tip of the module, e.g., the magnet may have a diameter amounting to 35 mm while tip of module is 5 mm. Hence, the magnetic field of the magnet may not change significantly within the small tip of the module so that the tip of the module may determine only a single test point of the magnetic field. With such single test point the circuitry determining the rotational position may thus not obtain enough information to derive the angular position of the magnet with a predetermined (high) accuracy.

In an example, the at least two sensor elements are arranged on, at or within a support structure, e.g., a module, wherein such support structure may have a predetermined shape at its end instead of the tip. Such predetermined shape may be a fork- or claw-like shape.

The predetermined shape may allow positioning the at least two sensor elements substantially along an arc around the shaft, wherein such arc may in particular cover an angle between 30° and 150°. The arc may in particular cover an angle amounting to (substantially) 90°. For example, the at least two sensor elements may at least partially circumvent the shaft.

If the magnetic field arrangement generates a magnetic field that varies with the sine of the rotation angle of the shaft, a sensor element at a specific position experiences a magnetic field that is proportional to the sine $\sin \varphi$ of the rotation angle $\varphi$, whereas another sensor element which is shifted by an angle $\alpha$ in rotational direction experiences a magnetic field proportional to $\sin (\varphi+\alpha)$.

If the angle $\alpha$ amounts to (substantially) 90°, the first sensor element detects a field that varies with $\sin \varphi$ and the second sensor element detects a field that varies with $\sin (\varphi+90°)=\cos \varphi$. Based on both fields, the rotation angle of the shaft can be determined, e.g., by the known CORDIC algorithm (see, e.g., http://en.wikipedia.org/wiki/CORDIC).

In case the angle $\alpha$ does not equal 90°, the rotation angle can be determined by use of trigonometric identities. In case a first sensor element supplies a signal $\sin \varphi$ and a second sensor element supplies a signal $\sin (\varphi+\alpha)$, the following applies:

$$\sin(\varphi+\alpha)/\sin(\varphi)=\cos(\alpha)+\sin(\alpha)/\tan(\varphi).$$

Hence, the system can determine a value for the ratio between the signals provided by both sensors elements, subtract $\cos(\alpha)$ divide it by $\sin(\alpha)$ and determine the inverse which then corresponds to $\tan(\varphi)$. The CORDIC algorithm then allows calculating the angle $\varphi$.

Figure 4:
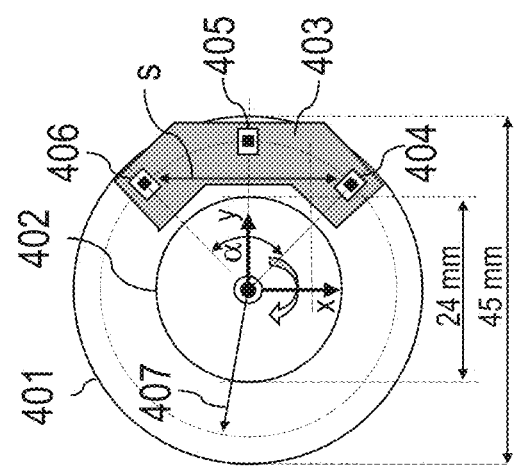
FIG. 4 shows a diagram comprising a plane view of an exemplary magnetic field arrangement that is arranged on a shaft via positive fitting and of an exemplary support structure comprising three sensor elements.

FIG. 4 shows a diagram comprising a plane view of an exemplary magnetic field arrangement 401 that is arranged on a shaft 402 via positive fitting. In this example, the magnetic field arrangement 401 is a magnet, which is hereinafter referred to as magnet 401. It is noted, however, that this is an exemplary embodiment and that the magnetic field arrangement is not restricted to a magnet.

A rotation of the shaft 402 also results in a rotation of the magnet 401. The magnet 401 has a rotational geometry with a central bore to accommodate the shaft 402.

FIG. 4 also shows three mutually perpendicular axes x, y and z, wherein x and y are within the plane of the figure and z is the rotation axis of the shaft 402 (perpendicular to the x-y-plane).

In addition, a support structure, also referred to as sensor 403, is shown having a predetermined claw-like shape. The sensor 403 comprises sensor elements 404, 405 and 406. In this example, the sensor elements are mutually shifted by 45°.

A circuitry (not shown in FIG. 4) may compute the angle by which the shaft 402 is rotated around the z axis. This can be achieved by utilizing a first signal difference d1

$$d1=S1-S2$$

and a second signal difference d2

$$d2=S2-S3,$$

wherein

S1 indicates the signal obtained by the sensor 404,
S2 indicates the signal obtained by the sensor 405 and
S3 indicates the signal obtained by the sensor 406.

The first signal difference d1 and the second signal difference d2 are phase-shifted by 45°.

As an alternative, a third signal difference d3 may be determined as $$d3=S1-S3$$

and a fourth signal difference d4 may be determined as $$d4=S2-(S1+S3)/2,$$

which is also phase shifted thereby allowing the circuitry determining the angular position of the shaft 402.

Advantageously, the sensor elements 404 to 406 are positioned along a circular curve which is concentric to the rotation axis z of the shaft 402, wherein the diameter of such circle may be twice a reading radius 407.

For example, physical dimensions may be as follows: The shaft 402 has a diameter of 24 mm, the magnet 401 has outer diameter amounting to 45 mm, the reading radius 407 is approximately 20 mm.

For a given reading radius 407 (abbreviated as Rr) a spacing s of the sensor elements 404 to 406 (i.e. a maximum spacing of reading elements, which may have an impact on the size of the claw-shaped sensor 403) results in $$s = 2 \cdot Rr \cdot \sin(\alpha/2);$$

For $\alpha=90°$ and Rr=20 mm the spacing s results in 28.3 mm, i.e. roughly 3 cm.

Hence, it may be advantageous to hold the sensor elements in place, relative to each other and relative to the shaft and to the magnetic field arrangement. In addition, electrical connections between the sensor elements may be required and the signals of the sensor elements have to be conveyed to the circuitry. Such circuitry may be or comprise a processing unit or a control unit that uses the rotation information for further control purposes. In one particular example, the (direct or already processed) signals from the sensors are conveyed outside the hull of an engine for appropriately determining and/or utilizing the angle information and thus for allowing to control the engine.

According to an exemplary embodiment, the sensor (support structure) may be or comprise a (component) board in the shape of a claw, which comprises electrical wires to contact at least two sensor elements. The sensor elements may be deployed on or within at least one substrate, e.g., a semiconductor substrate (e.g. for Hall effect sensors or MAG-FETs). Also, semiconductor or glass substrates can be used onto which magneto-resistive sensor elements may be sputtered (e.g., AMR, GMR, TMR sensor elements). After separation from a wafer, the sensor elements become dies. Such dies can be attached directly to the board, either with their active surface (i.e. the surface where the contacts of the sensor and optional evaluation circuitry are accessible) in a flip-chip manner or with their back surface (the opposite main surface of the die). Electrical contacts between the die and the traces in the component board can be made via flip-chip techniques (e.g., via bumps, balls) or via wire-bonding (e.g., wedge wire bonding or bump wire bonding). The dies and parts or all of the board can be covered by protective means like mold compound, gel, caps and/or plastic encapsulation. The end of the board, which is opposite the claw, may be equipped with a socket of a connector into which a plug may be inserted to allow for an electrical connection of the board (including its components). This socket may be attached to the hull of the engine thereby determining the position of the sensor elements relative to the shaft and magnetic field arrangement. The connector may be accessible from outside the hull.

According to another example, a stamped conductor grid made from copper or aluminum alloy may be used as a basic frame to make electrical contact between the sensor elements and the connector. Sensor elements may each be housed in a plastic encapsulated package (PEL) having leads (leaded sensor package), wherein the leads of the respective PELs are connected to the conductor grid. This can be achieved by welding, brazing, soldering or gluing (with conductive glue). After the electrical connection is established, the geometrical position of the sensor elements relative to each other may be fixed. The conductor grid may also be connected to the connecting socket and—as an option—to further (e.g., passive) components like load resistors, protective resistors, diodes, and capacitors that are connected to the conductor grid. All such components may be mechanically coupled to the conductor grid. The conductor grid with its attached components and with its socket may then be molded to protect them from environmental influence. Via this molding step the claw-shaped structure may be generated.

There are various options to place the sensor (module) radially or tangentially through the hull of the engine.

Figure 5:
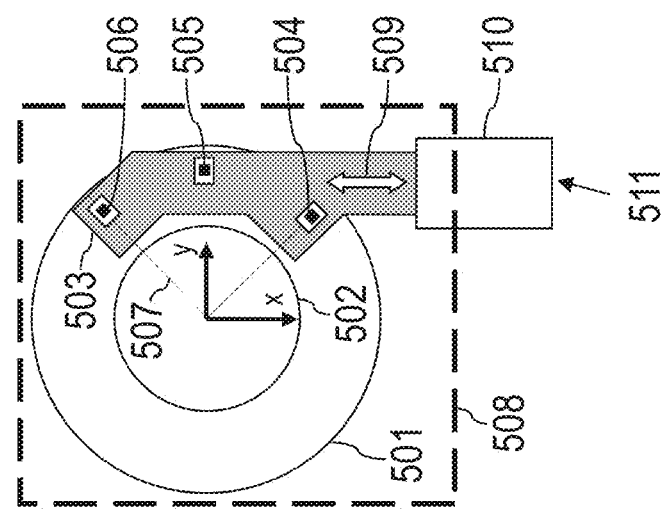
FIG. 5 shows a schematic plane view of a magnetic sensor system which is at least partially arranged inside a hull.

FIG. 5 shows a schematic plane view of a magnetic sensor system which is at least partially arranged inside a hull 508 (e.g., of an engine). A magnetic field arrangement 501 is arranged around a shaft 502 (e.g., a cam shaft of the engine). A support structure 503 comprises sensor elements 504, 505 and 506. The support structure has a claw-like shape and the sensor elements 504 to 506 are arranged on a circular line around the shaft 502. The distance between the sensor elements 504 and 506 is larger than the radius Rr 507. The support structure 503 is arranged in the vicinity of the magnetic field arrangement 501 so that the sensor elements 504 to 506 are capable of detecting a magnetic field or a change of the magnetic field. Advantageously, the support structure 503 and the sensor elements 504 to 506 are arranged in a way the movement (rotation) of the shaft 502 does not lead to a collision with the shaft 502 or the magnetic field arrangement 501.

The support structure 503 may comprise the sensor elements, electric wiring of the sensor elements, circuitry for processing signals from the sensor elements and/or towards external circuitry. The support structure 503 may be connected to a socket 510; the support structure 503 and (partially) the socket 510 may be inserted through the hull 508 and the socket may be mechanically connected to the hull, e.g., via screws or any other fastening means. This mechanical connection may be detachable for replacement or service purposes of the engine. It is an option that the socket 510 and the support structure 503 are integrally connected (one piece). Hence the arrangement comprising socket 510 and support structure 503 can be inserted (direction as indicated by an arrow 509) through the hole in the hull 508 and the socket 510 can then be mechanically connected with the hull to also define the location (placement) of the sensor elements 504 to 506 in relation to the shaft 502 and the magnetic field arrangement 501.

The socket 510 can be connected to a contactor and/or any other circuitry (indicated by an arrow 511).

FIG. 5 shows an example with the socket 510 being partially inserted into the engine (partially stuck through the hull 508). It is also an option to fully insert the socket 510 into the engine or to not insert the socket 510 into the engine. In all scenarios, the socket may be mounted at the hull 508 thereby providing a fixation for the support structure 503 and thus the sensor elements 504 to 506.

Figure 6:
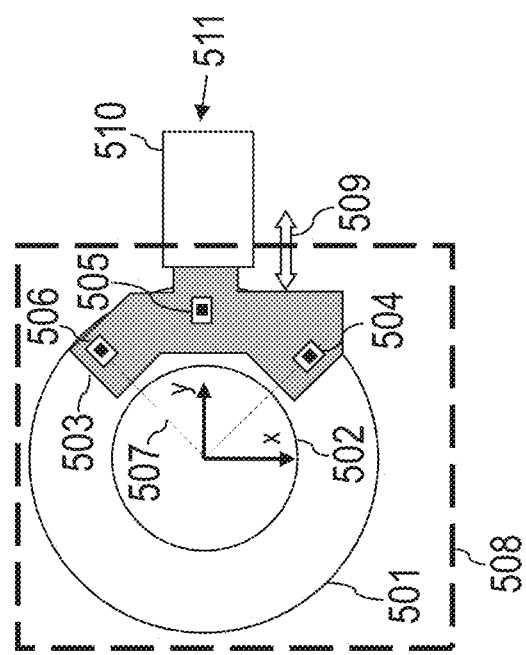
FIG. 6 shows a schematic plane view of an alternative magnetic sensor system.

FIG. 6 shows a schematic plane view of an alternative magnetic sensor system. FIG. 6 comprises the same components as FIG. 5. However, FIG. 6 shows a radial placement of the support structure (sensor), whereas FIG. 5 shows a tangential placement of the support structure (sensor).

Figure 7:
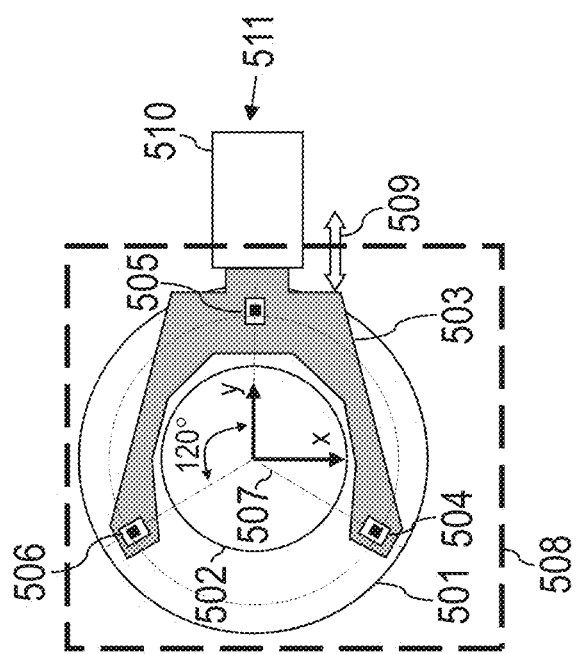
FIG. 7 shows an alternative embodiment based on FIG. 6, wherein the sensor elements span an angle of approximately 120° around the shaft.

FIG. 7 shows an alternative embodiment based on FIG. 6, wherein the sensor elements 504 and 505 span an angle of approximately 120° around the shaft, which is larger than the angle of approximately 45° shown in FIG. 5 and FIG. 6. The same applies for the angle between the sensor elements 505 and 506.

It is noted that the magnet could be diametrically magnetized, radially magnetized or axially magnetized. The magnet may have a single pole pair (one north and one south pole) or it may have multiple pole pairs arranged in rotational direction or in other directions. The magnetic field arrangement may comprise at least one permanent magnet. The magnetic field arrangement may comprise ferrous parts that act as yokes or fluxguides or magnetic shields against external magnetic disturbances.

The sensor element may be at least one of the following:
   a Hall effect sensor element comprising, e.g., Hall plates or a vertical Hall effect device;
   a magnetic field sensitive MOSFET (MAG-FET);
   a magneto-resistive device, e.g., an anisotropic magnetoresistance (AMR) device, a giant magnetoresistance (GMR) device or a tunnel magnetoresistance (TMR) device.

The sensor element may be arranged to detect a component of the magnetic field, in particular any of the x-, y-, z-, radial, azimuthal or axial component. The sensor element may detect a projection of the magnetic field vector into a sensor plane. The sensor element may detect the sine or cosine of such a projection with a reference direction. The sensor element may in this regard in particular be comparable to some types of magneto-resistors.

Advantageously, the magnetic field arrangement is placed such that it does not physically collide with the sensor during rotation of the shaft. As the magnetic field arrangement is fixed with the shaft, the rotation of the shaft leads to a rotation of the magnetic field arrangement, which should not lead to a collision with the sensor that is arranged with a non-rotating component, e.g., the hull of the engine.

The magnetic field arrangement may have a bulky shape, it may have slots, grooves, protrusions, e.g., on the outer perimeter which allow movement of the sensor without colliding with the magnetic field arrangement. It is also an option that the magnetic field arrangement comprises several parts that are connected to the shaft, wherein the several parts are spaced from each other such that they provide a gap for the sensor to be placed at least partially within such parts.

The magnetic field arrangement may be arranged such that it allows generating a magnetic field pattern. Preferably, such magnetic field pattern is detectable (in particular identifiable) by the sensor element(s) across the angle range which is subject to detection. This can be achieved for a magnetic field arrangement providing a unique magnetic field pattern for the sensor elements to detect. Uniqueness may in particular apply for a limited space, e.g., a machine, an engine, a vehicle. It may but does not have to be globally unique. The magnetic field arrangement may comprise at least one magnet. However, the magnetic field arrangement may also cope without having a magnet as such. The magnetic source itself may be part of another system, not the magnetic field arrangement. Hence, the magnetic field arrangement (even without having a magnet itself) may modify an (existing) magnetic field in a manner that is detectable to the sensor.

For example, a permanent magnet may be attached to a stator and some asymmetric iron discs may be attached to a rotor. The field of the permanent magnet is altered by the rotating iron discs. Hence, the iron discs may serve as the magnetic field arrangement according to the examples described herein: the iron discs are attached to the shaft, because they need to rotate. The permanent magnet does not have to be attached to the shaft or move (rotate); the (immobile) permanent magnet generates a field that is not unique for all angles, but the iron discs alter this magnetic field and it thereby becomes unique for all angles.

The examples suggested herein may in particular be based on at least one of the following solutions. In particular combinations of the following features could be utilized in order to reach a desired result. The features of the method could be combined with any feature(s) of the device, apparatus or system or vice versa.

An angle sensor is suggested for detecting a rotational position of a shaft to which a magnetic field arrangement is attached, comprising:
   a first sensor element,
   a second sensor element,
   a support structure, wherein the first sensor element and the second sensor element are mechanically coupled to the support structure,
   wherein the support structure is arranged to be mechanically connected to a hull, wherein the hull at least partially encloses the shaft.

Hence, the sensor elements are located beside the shaft. It is in particular an option that more than two sensor elements are arranged on, in or at the support structure.

The hull may be a hull of an engine, in particular a combustion engine. The shaft may be a cam shaft of the engine.

The support structure may be a carrier or frame comprising at least two sensor elements. The support structure may also comprise circuitry for processing signals detected by the sensor elements. Also, the support structure may comprise wiring for connecting the sensor elements, the circuitry and/or a socket that provides connection to an external circuitry, e.g., a processing unit or electronic control unit.

It is an option that the magnetic field supplied has a periodicity of 360°, i.e. it may in particular be substantially uniform across 360°. It is another option that the magnetic field arrangement or a separate magnetic structure comprises a diametrically magnetized permanent magnet.

Advantageously, the examples provided allow for a high robustness against external magnetic disturbances. The sensor estimates the rotation angle of the shaft and is largely insusceptible to superimposed homogeneous magnetic fields. It is also an advantage that the solution copes with assembly tolerances between magnetic field arrangement, shaft and/or sensor element(s). The examples provided are in particular cost-efficient, because the assembly process does not require a high complexity to ensure low tolerances.

According to an embodiment, the first sensor element and the second sensor element are separated by a distance amounting to at least the radius of the shaft, in particular the diameter of the shaft.

According to an embodiment, the first sensor element and the second sensor element are separated by a distance amounting to at least the distance between any of the sensor elements to a rotation axis of the shaft.

According to an embodiment, the first sensor element and the second sensor element are arranged substantially along a circular curve around a rotation axis of the shaft.

According to an embodiment, the support structure has a claw-like shape that is partially arranged around the shaft or the magnetic field arrangement.

According to an embodiment, the claw-like shape is provided by a mold or isolation at least partially surrounding the support structure.

According to an embodiment, the claw-like shape is arranged such that the support structure and the magnetic field arrangement do not collide.

According to an embodiment, the support structure has an opening larger than the diameter of the shaft.

According to an embodiment, the support structure comprises a socket that is connected or connectable to the hull.

According to an embodiment, the hull comprises an opening for inserting the support structure, wherein the socket is releasably connectable to the hull.

The socket may be connected to the hull via at least one screw or any other detachable fastening means.

It is also an option that the socket is connected to the hull from inside the hull.

By fastening the socket and hence the support structure to the hull, the at least two sensor elements are placed in relation to the shaft and the magnetic field arrangement.

It is further an option to attach the support structure to the hull. This can be achieved by a detachable fastening means, e.g., at least one screw fitting. The supporting structure may in this regard comprise a fastening portion that can be used for being jointed to the hull.

It is in particular an advantage that the support structure comprising the at least two sensor elements can be replaced without having to open the hull.

It is an option that the support structure can be mounted from the exterior through a hole inside the hull around the shaft. In such scenario, the at least one sensor element may be located at or near a first end of the support structure and a second end of the support structure comprises contacting means that allow to electrically connect the sensor elements of the support structure to, e.g., external circuitry. The first end and the second end of the support structure may be located at opposing sides of the support structure. The contacting means may comprise the socket (which may be mechanically fastened at the hull). By mounting the support structure (through the hole in the hull), the hull itself does not have to be opened. This allows an easy and efficient replacement of the support structure or portions of the support structure.

According to an embodiment, the angle sensor is an off-axis magnetic angle sensor.

The angle sensor may be an off-axis magnetic angle sensor with regard to the rotation axis of the shaft.

According to an embodiment, at least one of the sensor elements is of one of the following type:
- a magnetic sensor;
- a hall sensor;
- a GMR sensor;
- a TMR sensor;
- a AMR sensor;
- a MAG-FET.

It is noted that several of the sensor elements can be of the same type or of different types. The sensor element may be deployed on, at or within at least one carrier, e.g., a substrate, in particular a semiconductor substrate.

According to an embodiment, the magnetic field arrangement comprises a component that allows generating a magnetic field pattern.

According to an embodiment, the magnetic field arrangement comprises at least one permanent magnet.

According to an embodiment, the magnetic field arrangement comprises at least one component to influence the magnetic field detected by the first sensor element and the second sensor element.

Such component may in particular be magnetically soft. The component may have a permeability larger than 100, in particular larger than 1000.

According to an embodiment,
the first sensor element is located at a first radius and wherein the second sensor element is located at a second radius from the axis of the rotation of the shaft;
the first sensor element and the second sensor element are arranged such that they are separated by a distance that is at least one of the following:
at least a fifth of the sum of first and second reading radius;
smaller or equal to the sum of first and second reading radius.

As an option, the first and the second radius are (substantially) the same.

According to an embodiment, an angle between vectors based on the first radius and the second radius amounts to at least 20°.

The angle may in particular refer to the smaller one of the two possible angles between two radial vectors that are based on the first radius and the second radius.

According to an embodiment,
the support structure comprises a conductor grid,
the first sensor element comprises a first plastic encapsulated package and the second sensor element comprises a second plastic encapsulated package,
terminals of the first sensor element and terminals of the second sensor element are electrically connected to the conductor grid.

According to an embodiment, an electrical connector is coupled to the connector grid.

Also, a system for detecting a rotational position of a shaft is provided, such system comprising:
a magnetic field arrangement mechanically coupled to the shaft,
a first sensor element,
a second sensor element,
a support structure, wherein the first sensor element and the second sensor element are mechanically coupled to the support structure,
wherein the support structure is arranged to be mechanically connected to a hull, wherein the hull at least partially encloses the shaft.

According to an embodiment, the support structure comprises a socket that is connectable or connected to the hull.

According to an embodiment, the sensor elements of the support structure are electrically connectable via the socket to a circuitry external to the hull.

Further, an engine comprising at least one angle sensor as described herein is suggested.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. An angle sensor for detecting a rotational position of a shaft of an engine, wherein a magnetic field arrangement is attached to the shaft, the angle sensor comprising:
   a first sensor element;
   a second sensor element; and
   a support structure having a socket that is releasably connectable to a hull of the engine, is insertable through an opening of the hull, has a claw-like shape that is partially arranged around the shaft or the magnetic field arrangement, is arranged such that movement of the shaft does not result in a collision with the shaft, has the first sensor element and the second sensor element mechanically coupled to the support structure to form a sensor module, and is arranged such that while the angle sensor is installed in the hull of the engine, the sensor module is replaceable while the shaft remains supported in its bearings.

2. The sensor according to claim 1, wherein the first sensor element and the second sensor element are separated by a distance amounting to at least the radius of the shaft.

3. The sensor according to claim 1, wherein the first sensor element and the second sensor element are separated by a distance amounting to at least the distance between any of the sensor elements to a rotation axis of the shaft.

4. The sensor according to claim 1, wherein the first sensor element and the second sensor element are arranged substantially along a circular curve around a rotation axis of the shaft.

5. The sensor according to claim 1, wherein the claw-like shape is provided by a mold or isolation at least partially surrounding the support structure.

6. The sensor according to claim 1, wherein the claw-like shape is arranged such that the support structure and the magnetic field arrangement do not collide.

7. The sensor according to claim 1, wherein the support structure has an opening larger than the diameter of the shaft.

8. The sensor according to claim 1, wherein the angle sensor is an off-axis magnetic angle sensor.

9. The sensor according to claim 1, wherein at least one of the sensor elements is of one of the following type:
   a magnetic sensor;
   a hall sensor;
   a GMR sensor;
   a TMR sensor;
   a AMR sensor;
   a MAG-FET.

10. The sensor according to claim 1, wherein the magnetic field arrangement comprises a component that allows generating a magnetic field pattern.

11. The sensor according to claim 1, wherein the magnetic field arrangement comprises at least one permanent magnet.

12. The sensor according to claim 1, wherein the magnetic field arrangement comprises at least one component to influence the magnetic field detected by the first sensor element and the second sensor element.

13. The sensor according to claim 1,
   wherein the first sensor element is located at a first radius and wherein the second sensor element is located at a second radius from the axis of the rotation of the shaft;
   wherein the first sensor element and the second sensor element are arranged such that they are separated by a distance that is at least one of the following:
      at least a fifth of the sum of first and second reading radius;
      smaller or equal to the sum of first and second reading radius.

14. The sensor according to claim 13, wherein an angle between vectors based on the first radius and the second radius amounts to at least 20°.

15. The sensor according to claim 1,
   wherein the support structure comprises a conductor grid,
   wherein the first sensor element comprises a first plastic encapsulated package and the second sensor element comprises a second plastic encapsulated package,
   wherein terminals of the first sensor element and terminals of the second sensor element are electrically connected to the conductor grid.

16. The sensor according to claim 15, wherein an electrical connector is coupled to the connector grid.

17. An engine comprising at least one angle sensor according to claim 1.

18. A system for detecting a rotational position of a shaft of an engine, comprising:
   a magnetic field arrangement mechanically coupled to the shaft;
   a first sensor element;
   a second sensor element; and
   a support structure having a socket that is releasably connectable to a hull of the engine, is insertable through an opening of the hull, has a claw-like shape that is partially arranged around the shaft or the magnetic field arrangement, is arranged such that movement of the shaft does not result in a collision with the shaft, has the first sensor element and the second sensor element mechanically coupled to the support structure to form a sensor module, and is arranged such that while the angle sensor is installed in the hull of the engine, the sensor module is replaceable while the shaft remains supported in its bearings.

19. The system according to claim 18, wherein the sensor elements of the support structure are electrically connectable via the socket to a circuitry external to the hull.

* * * * *